(12) United States Patent
Shin et al.

(10) Patent No.: US 12,474,189 B2
(45) Date of Patent: Nov. 18, 2025

(54) ELECTROCHEMICAL APPARATUS FOR MONITORING FLOW RATE

(71) Applicant: CAREMEDI CO., LTD., Seoul (KR)

(72) Inventors: Woon Sup Shin, Seoul (KR); Enhua Zhu, Seoul (KR); Tae Jwa Park, Seoul (KR)

(73) Assignee: CAREMEDI CO., LTD., Seoul (KR)

( * ) Notice: Subject to any disclaimer, the term of this patent is extended or adjusted under 35 U.S.C. 154(b) by 583 days.

(21) Appl. No.: 18/095,088

(22) Filed: Jan. 10, 2023

(65) Prior Publication Data

US 2023/0158233 A1 May 25, 2023

Related U.S. Application Data

(63) Continuation-in-part of application No. PCT/KR2021/008690, filed on Jul. 8, 2021.

(30) Foreign Application Priority Data

| Jul. 10, 2020 | (KR) | 10-2020-0085710 |
| Jul. 7, 2021 | (KR) | 10-2021-0089241 |

(51) Int. Cl.
*G01F 1/64* (2006.01)
*G01F 1/56* (2006.01)
(Continued)

(52) U.S. Cl.
CPC .......... *G01F 1/64* (2013.01); *G01F 1/56* (2013.01); *G01F 1/7046* (2013.01); *A61M 5/16886* (2013.01)

(58) Field of Classification Search
CPC . G01F 1/56; G01F 1/64; G01F 1/7046; G01F 1/7048; A61M 5/16886
See application file for complete search history.

(56) References Cited

U.S. PATENT DOCUMENTS

| 4,953,407 A * | 9/1990 | Malaczynski ......... G01F 1/7048 |
| | | 73/861.09 |
| 8,628,652 B2 * | 1/2014 | Small ...................... F04B 17/00 |
| | | 204/522 |

(Continued)

FOREIGN PATENT DOCUMENTS

| AU | 614987 B2 | 9/1991 |
| EP | 0077413 A1 | 4/1983 |

(Continued)

OTHER PUBLICATIONS

Extended European Search Report of EP patent application No. 21837077.3 dated May 28, 2024.

(Continued)

*Primary Examiner* — Justin N Olamit
(74) *Attorney, Agent, or Firm* — Dinsmore & Shohl LLP.; Yongsok Choi, Esq.

(57) ABSTRACT

The present invention provides an electrochemical apparatus for monitoring flow rate including a membrane having a space that is formed in a middle portion of the membrane and has a preset volume to contain an ionic fluid, a first electrode and a second electrode provided on both sides of the membrane, and a control unit configured to apply a voltage to the first electrode and the second electrode to change a state of the space to a concentration polarization state, wherein the membrane includes a fluid flow passage through which a fluid flows into and out of the space, and the control unit calculates a flow rate based on an ionic current generated by the fluid injected through the fluid flow passage in the concentration polarization state.

7 Claims, 11 Drawing Sheets

(51) Int. Cl.
*G01F 1/704* (2006.01)
*A61M 5/168* (2006.01)

(56) References Cited

U.S. PATENT DOCUMENTS 11,185,859 B2 * 11/2021 Yossifon ........... B01L 3/502715
2012/0138474 A1 6/2012 Small et al.

FOREIGN PATENT DOCUMENTS

| | | |
|---|---|---|
| JP | H10-274661 A | 10/1998 |
| JP | 2003-042827 A | 2/2003 |
| JP | 2006337221 A | 12/2006 |
| JP | 2012122883 A | 6/2012 |
| KR | 10-0292799 B1 | 2/2002 |
| KR | 10-1484540 B1 | 1/2015 |
| KR | 10-2017-0109523 A | 9/2017 |

OTHER PUBLICATIONS

International Search Report of PCT/KR2021/008690, dated Oct. 19, 2021; pp. 1-3.

* cited by examiner

FIG. 1

PRIOR ART

ELECTROCHEMICAL APPARATUS FOR MONITORING FLOW RATE

CROSS-REFERENCE TO RELATED APPLICATIONS

This application is a continuation of International Application No. PCT/KR2021/008690 filed on Jul. 8, 2021, which claims the benefit under 35 USC 119(a) of Korean Patent Application No. 10-2021-0089241 filed on Jul. 7, 2021, and Korean Patent Application No. 10-2020-0085710 filed on Jul. 10, 2020, in the Korean Intellectual Property Office, the entire disclosures of which are incorporated herein by reference for all purposes.

TECHNICAL FIELD

The present invention relates to an electrochemical apparatus for monitoring flow rate.

BACKGROUND

A drug injection pump has to be precisely controlled and injected to be effective in treatment and to minimize side effects caused by misinjection (overinjection or underinjection). Currently, the drug injection pump used in hospitals and the like includes a volumetric pump, a syringe pump, and an implantable pump. In most cases, flow rate monitoring is not accurately measured and controlled. This is because there is no technology for precisely measuring a flow rate of microliters or nanoliters that may be used individually.

Figure 1:
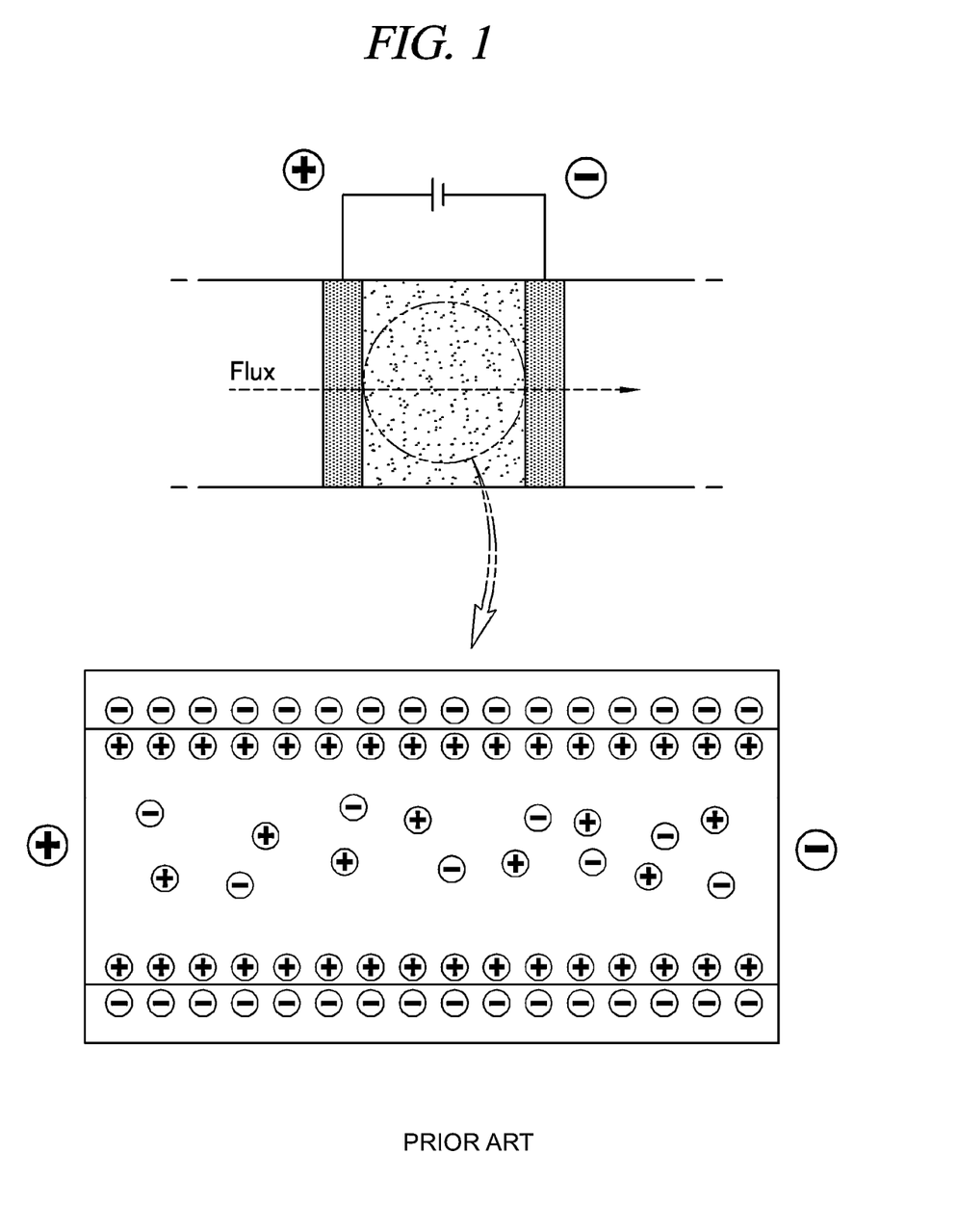
FIG. 1 is a diagram illustrating an electrode used for the conventional electroosmotic pump.

FIG. 1 is a diagram illustrating an electrode used in the conventional electroosmotic pump.

The electroosmotic pump uses movement of a fluid due to an electroosmotic phenomenon occurring when a voltage is applied by using electrodes at both ends of a porous member (porous membrane). Silica, glass, and so on are generally used as a material for the porous membrane, and when the material is immersed in an aqueous solution, a surface thereof is negatively charged. In this state, when a voltage is applied thereto, a fluid moves from a positive (+) electrode to a negative (−) electrode (see upper figure of FIG. 1). The porous membrane has many passages through which a number of fluids may pass. When one of the passages is enlarged, a surface of the fluid passage (which becomes a surface of a porous membrane material) has a negative charge (bound anion), and thereby, positive ions (mobile cations) with positive (+) charges that may move in a contacting fluid move to balance the charges. In this case, when a voltage is applied, the positive ions (mobile cations) move along the surface from the positive (+) electrode to the negative (−) electrode. Accordingly, a phenomenon occurs in which the entire fluid connected by a hydrogen bond network flows in a sliding manner, which is called an electroosmosis phenomenon, and a pump using this principle is the electroosmotic pump.

Referring to FIG. 1, an electrode used in an electroosmotic pump is coated with a platinum mesh that is a porous electrode, porous carbon paper or carbon cloth, or a variety of electrode materials to be coated on a porous structure so as to facilitate fluid movement. In addition, when a voltage is applied to the electrode with a porous film formed of silica or so on interposed therebetween, the fluid moves accordingly.

A flow rate of the electroosmotic pump may be adjusted by a magnitude of a voltage, time during which the voltage is applied, and so on. Therefore, in order to improve the injection accuracy of the electroosmotic pump, a precise flow rate monitoring device capable of providing feedback on the flow rate is required.

In this regard, as the conventional art, a flow rate measurement device that uses an electrochemical polarization phenomenon has been reported (ACS Sensors 2019). The device uses a method in which, instead of directly measuring a current, a separate electrode pair that causes the concentration polarization is provided, and impedance is measured with another electrode pair in a passage through which a fluid passes. Since the electrode directly touches the fluid to be measured, there is a risk of contamination when the fluid is a drug.

SUMMARY OF INVENTION

Technical Problem

An embodiment of the present invention provides an electrochemical apparatus for monitoring flow rate that precisely monitors a flow rate of microliters or nanoliters to prevent risks and side effects caused by overinjection and underinjection of a drug without contamination of the drug and injects a solution with a certain ion concentration.

However, technical objects to be achieved by the present embodiment are not limited to the technical object described above, and other technical objects may further exist.

Solution to Problem

In order to solve the technical problems described above, an electrochemical apparatus for monitoring flow rate includes a membrane having a space that is formed in a middle portion of the membrane and has a preset volume to contain an ionic fluid, a first electrode and a second electrode provided on both sides of the membrane, and a control unit configured to apply a voltage to the first electrode and the second electrode to change a state of the space to a concentration polarization state, wherein the membrane includes a fluid flow passage through which a fluid flows into and out of the space, and the control unit calculates a flow rate based on an ionic current generated by the fluid injected through the fluid flow passage in the concentration polarization state.

The fluid may have a low ion concentration of 0.1 mM (milimolar) to 10 mM.

The space of the membrane may have a volume of 2 μL to 4 μL.

A distance between the first electrode and the second electrode may be 50 um to 1 mm.

The electrochemical apparatus for monitoring flow rate may further include connection portions formed in a protruding shape on one side of the first electrode and one side of the second electrode and electrically connected to the control unit.

The electrochemical apparatus for monitoring flow rate may further include a pumping unit connected to the fluid flow passage and configured to inject a fluid having a preset flow rate into the space.

The control unit may include a power supply unit configured to supply a preset voltage to the first electrode and the second electrode, and a measurement unit configured to measure an ionic current generated by ions of the fluid injected into the space which move to both ends of the first electrode and the second electrode.

Advantageous Effects

According to the present invention, concentration polarization and a current or electric charges proportional to a flow rate may be measured by a pair of electrodes. Therefore, the present invention is not only structurally different from the conventional art including a separate electrode pair causing concentration polarization, but also provides a much simpler form.

The flow rate measurement according to the present invention may be applied to all solutions having a certain ion concentration and is very useful for application to electroosmotic pumps that utilize solutions with a low ion concentration of about 0.1 to 10 mM.

In addition, when the flow rate monitoring device according to the present invention is connected to the existing electroosmotic pump through feedback of a flow rate, the flow rate may be controlled much more accurately.

In addition, the flow rate monitoring device according to the present invention may be used for various other quantitative injections in addition to drugs and may solve a bottle-neck problem that currently appears in the development field of flow rate sensors.

DETAILED DESCRIPTION

Hereinafter, embodiments of the present invention will be described in detail with reference to the accompanying drawings such that those skilled in the art to which the present invention belongs may easily implement the present invention. However, the present invention may be embodied in various different forms and is not limited to the embodiments described herein. In addition, in order to clearly illustrate the present invention in the drawings, parts irrelevant to the descriptions are omitted, and similar reference numerals are attached to similar parts throughout the specification.

Throughout the specification of the present invention, when a portion is "connected" or "coupled" to another portion, this includes not only a case of being "directly connected or coupled" but also a case of being "electrically connected" with another element interposed therebetween.

Throughout the specification of the present invention, when it is described that a member is "on" another member, this includes not only a case where a member is in contact with another member, but also a case where there is another member between the two members.

Throughout the specification of the present invention, when a portion "includes" a certain component, this means that other components may be further included therein rather than excluding other components, unless otherwise stated. As used throughout the specification of the present invention, when manufacturing and material tolerances inherent in the stated meaning are given, terms "about", "substantially", and so on are used at or approximating the value and used to prevent disclosures in which exact or absolute figures are stated to aid understanding of the present invention from being unfairly used by unscrupulous infringers. Term "step of (doing)" or "step of" used throughout the specification of the present invention does not indicate "step for".

The present invention includes a technology that increases injection accuracy of a micro-precision pump such as a drug pump by precisely monitoring a flow rate of microliters or nanoliters, and an electrochemical principle is applied to the technology. In particular, ionicity (ion concentration) of a solution may be applied to determine a flow rate of a constant solution. When an ionic liquid (a fluid, a solution) is injected in a state where concentration polarization of ions is induced by applying a voltage between two electrodes, the ions contained in the liquid move to both ends of the electrodes, and thereby, a current (ionic current) is measured. In this case, since the current is proportional to a flow rate of the input fluid, the measured current or charges may be used as a quantitative index associated with the flow rate.

Figure 2A:
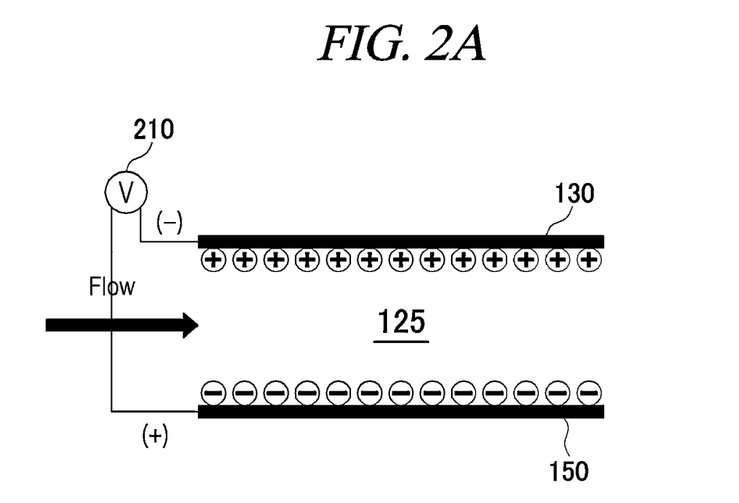
FIGS. 2A and 2B illustrate principle of measuring an ionic current according to injection of an ionic solution after polarization, according to an embodiment of the present invention.
Figure 2B:
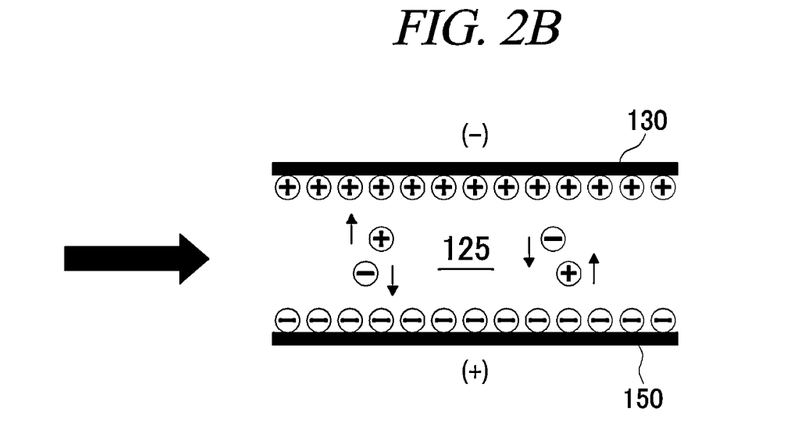
Figure 3A:
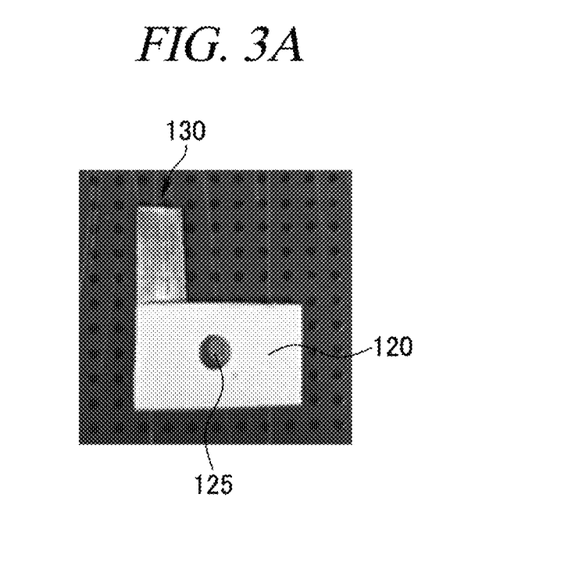
FIGS. 3A and 3B illustrate a fluid flow passage coupled to an electrode for a flow rate sensor and a pumping configuration according to an embodiment of the present invention.
Figure 3B:
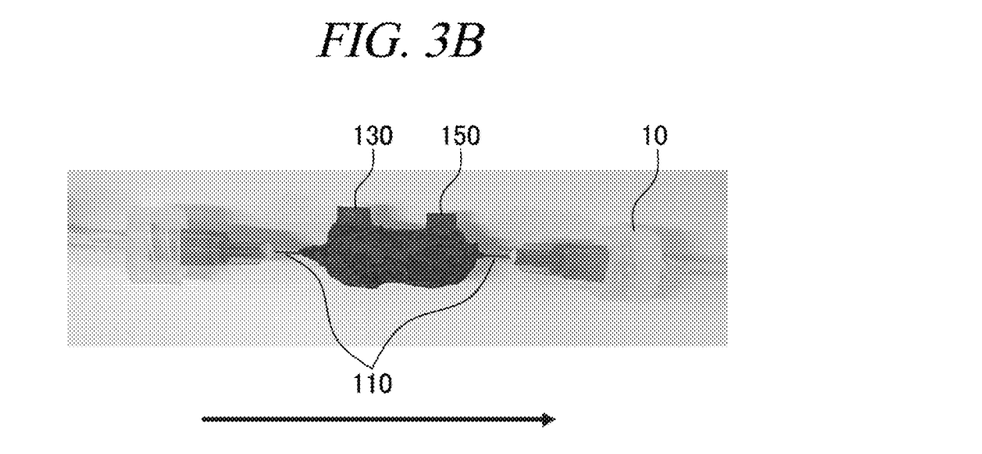
Figure 4A:
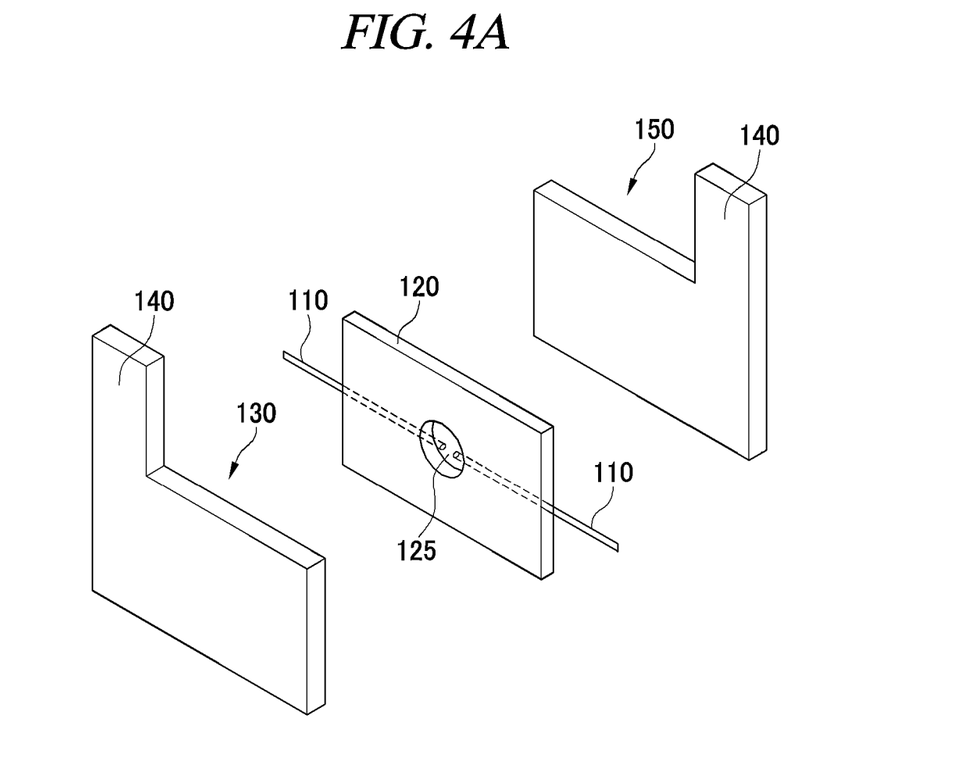
FIG. 4A is a view schematically illustrating a membrane arranged between electrodes for a flow rate sensor, according to an embodiment of the present invention.
Figure 4B:
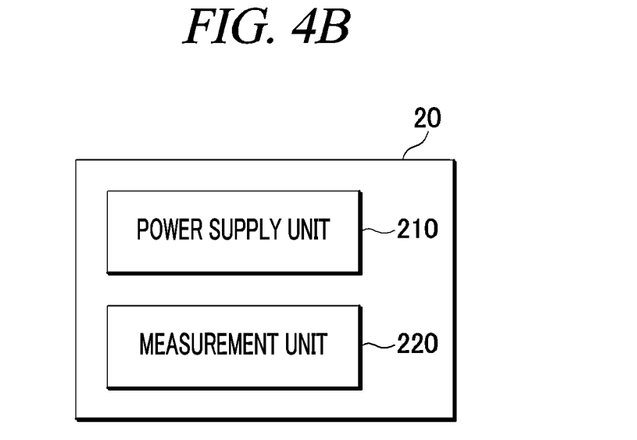
FIG. 4B is a block diagram illustrating a configuration of a control unit according to an embodiment of the present invention.

FIGS. 2A and 2B illustrate principle of measuring an ionic current according to injection of an ionic solution after polarization, according to an embodiment of the present invention. FIGS. 3A and 3B illustrate a fluid flow passage coupled to an electrode for a flow rate sensor and a pumping configuration according to an embodiment of the present invention. FIG. 4A is a view schematically illustrating a membrane arranged between electrodes for a flow rate sensor, according to an embodiment of the present invention. FIG. 4B is a block diagram illustrating a configuration of a control unit according to an embodiment of the present invention.

As illustrated, an electrochemical apparatus for monitoring flow rate according to an embodiment of the present invention includes a pumping unit 10, a fluid flow passage 110, a membrane 120 having a space 125, a first electrode 130, a connection portion 140, a second electrode 150, and a control unit 20 including a power supply unit 210 and a measurement unit 220.

Specifically, the flow rate monitoring device according to the present invention includes the membrane 120 having the space 125 which is formed in the middle thereof and has a preset volume to contain an ionic fluid, the first electrode 130 and the second electrode 150 provided on both sides of the membrane 120, and the control unit 20 that changes a space into a concentration polarization state by applying a voltage to the first electrode 130 and the second electrode 150. In this case, the membrane 120 includes the fluid flow passage 110 through which a fluid flows into and out of the space. In addition, the control unit 20 calculates a flow rate of a fluid injected through the fluid flow passage 110 in the concentration polarization state, based on an ionic current value generated by the fluid.

For example, the fluid may be a solution with a low ion concentration of 0.1 mM to 10 mM but is not limited thereto. The solution with a low ion concentration of about 0.1 mM to 10 mM is generally used for an electroosmotic pump, and electroosmosis is more advantageous when the solution has a lower ion concentration.

For example, FIG. 4A is a perspective view schematically illustrating an arrangement relationship between the first electrode 130, the membrane 120, and the second electrode 150 illustrated in FIGS. 3A and 3B.

The first electrode 130 and the second electrode 150 may be arranged on both sides of the membrane 120.

In addition, the first electrode 130 and the second electrode 150 may respectively include the connection portions 140 each protruding from one side. In this case, the connection portions 140 may be electrically connected to the control unit 20.

The membrane 120 may have a preset volume and may include the space 125 in which an ionic fluid is introduced through the fluid flow passage 110 to be and contained therein.

For example, the membrane 120 may be formed of a non-porous thin film. Accordingly, a fluid may be injected into the space 125 through the fluid flow passage 110, and the injected fluid may be contained in the space 125. In this case, the space 125 of the membrane 120 may be formed to have a volume of 2 μL to 4 μL and serves to contain a fluid. Preferably, the space 125 has a circle shape to have a diameter of 2 mm, a thickness of 1 mm, and a volume of about 3 μL. Here, a shape of the passage is not limited to a circle shape, and may be formed to have various volumes depending on flow rates.

For example, the first electrode 130 and the second electrode 150 are coupled to both sides of the membrane 120 illustrated in FIG. 4A, and the pumping unit 10 illustrated in FIGS. 3A and 3B may be connected to the fluid flow passage 110.

In this case, the pumping unit 10 may be connected to the fluid flow passage 110 to inject a fluid at a preset flow rate into the space 125. For example, the pumping unit 10 may be connected to the conventional electroosmotic pump to control a flow rate but is not limited thereto.

In addition, as illustrated in FIGS. 2A and 2B, a combined electrode for a flow rate sensor may include the first electrode 130 and the second electrode 150 facing each other and having the space 125 formed therebetween to penetrate the middle of the membrane 120. For example, a distance between the first electrode 130 and the second electrode 150 may be 50 um to 1 mm.

For example, referring to FIG. 2A, the power supply unit 210 may apply a voltage that does not cause electrolysis to both ends of the first electrode 130 and the second electrode 150 such that the space 125 of the membrane 120 between the first electrode 130 and the second electrode 150 changes to a concentration polarization state. Preferably, the power supply unit 210 may apply a voltage of 1.0 V.

Subsequently, when a fluid containing ions is injected into the space 125 which is located between the first electrode 130 and the second electrode 150 and is in the concentration polarization state, a positive ionic current flows in the space 125 between the first electrode 130 and the second electrode 150 as illustrated in FIG. 2B. In this case, the control unit 20 may measure a current or the amount of electric charges generated inside the space 125 and calculate a minute volume of a fluid based on the measured value.

Referring to FIG. 4B, the control unit 20 may include the power supply unit 210 that supplies a preset voltage to the first electrode 130 and the second electrode 150, and the measurement unit 220 that measures an ionic current generated when ions of the fluid injected into the space 125 move to both ends of the first electrode 130 and the second electrode 150. For example, the connection portions 140 protruding from the first electrode 130 and the second electrode 150 illustrated in FIG. 4A may be connected to the control unit 20.

Hereinafter, characteristics of a flow rate and a current will be described by using a flow rate monitoring device according to an embodiment of the present invention.

(Example 1) Configuration of Flow Rate Sensor

For example, as illustrated in FIGS. 3A and 3B, the electrochemical apparatus for monitoring flow rate according to the present invention includes the space 125 formed to have a certain volume in the middle of a double-sided tape (membrane 120) between the first and second electrodes 130 and 150, and the fluid flow passage 110 through which the solution may come in and out the space 125. In addition, as illustrated in FIG. 4B, the electrochemical apparatus for monitoring flow rate includes connection portions 140 provided at both ends of the electrodes 130 and 150 to measure a current when a voltage is applied from the outside. In this case, the circle space 125, which is a passage that contains a fluid and serves as a flow rate sensor, has a diameter of 2 mm, a thickness of 1 mm, and a volume of about 3 μL.

Figure 5A:
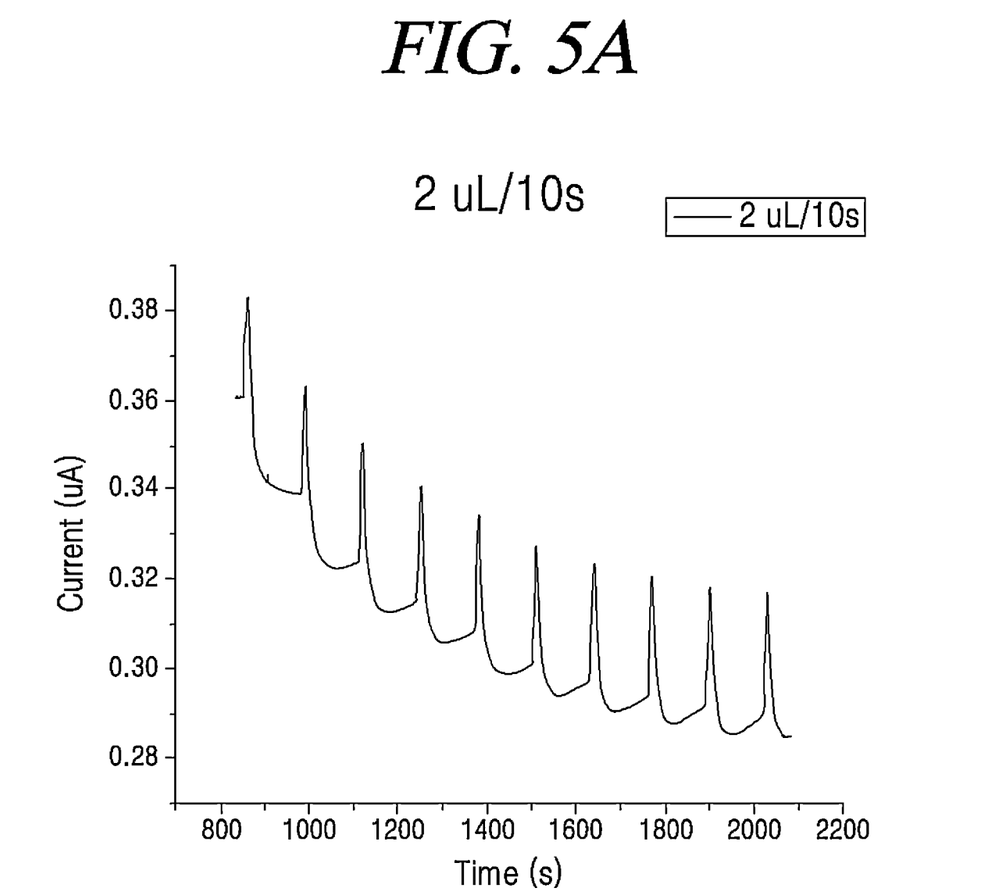
FIGS. 5A, 5B and 5C illustrate graphs of changes in current characteristics according to injection of an ionic solution between electrodes polarized at intervals of 1 mm, according to an embodiment of the present invention.
Figure 5B:
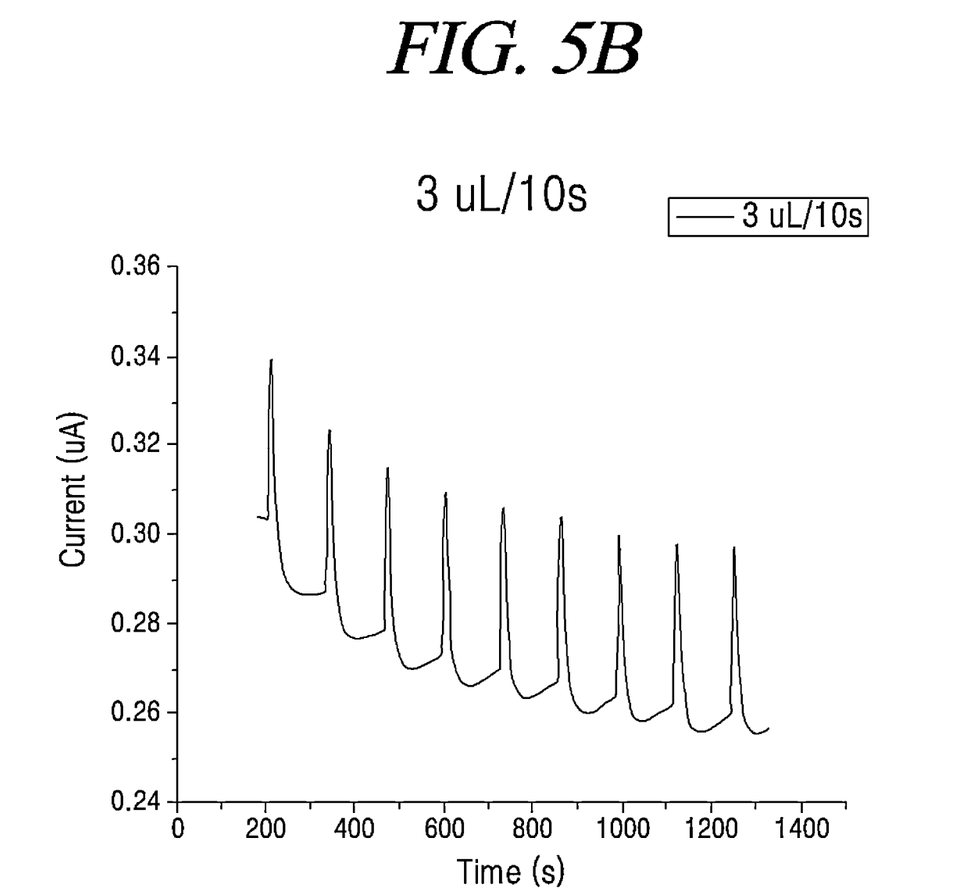
Figure 5C:
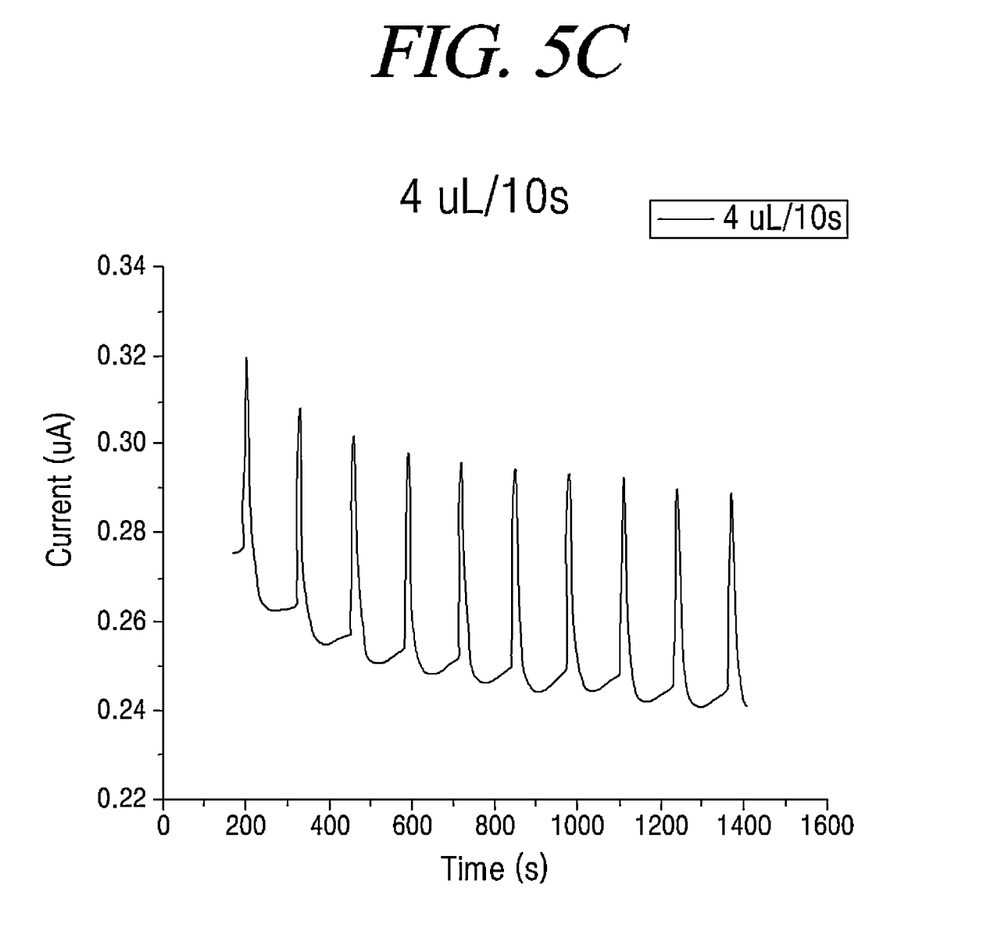

FIGS. 5A, 5B and 5C illustrate graphs of changes in current characteristics according to injection of an ionic solution between electrodes polarized at intervals of 1 mm, according to an embodiment of the present invention.

(Example 2) Performance of Flow Rate Sensor Using Electrodes Having Distance of 1 mm Therebetween Referring to FIGS. 5A, 5B and 5C, a voltage of 1.0 V is applied to the first and second electrodes 130 and 150 to change an internal state of the space 125 to a concentration polarization state. Thereafter, solutions $Li_2SO_4$ of 0.5 mM were injected respectively by 2 μL, 3 μL, and 4 μL for 10 seconds by using the pumping unit 10 (a syringe pump), and current characteristics were observed. As illustrated in FIG. 5A to FIG. 5C, when a fluid (solution) of 2 μL, a fluid (solution) of 3 μL, and a fluid (solution) of 4 μL are sequentially injected, the current characteristics show that the current is reduced with time.

Figure 6A:
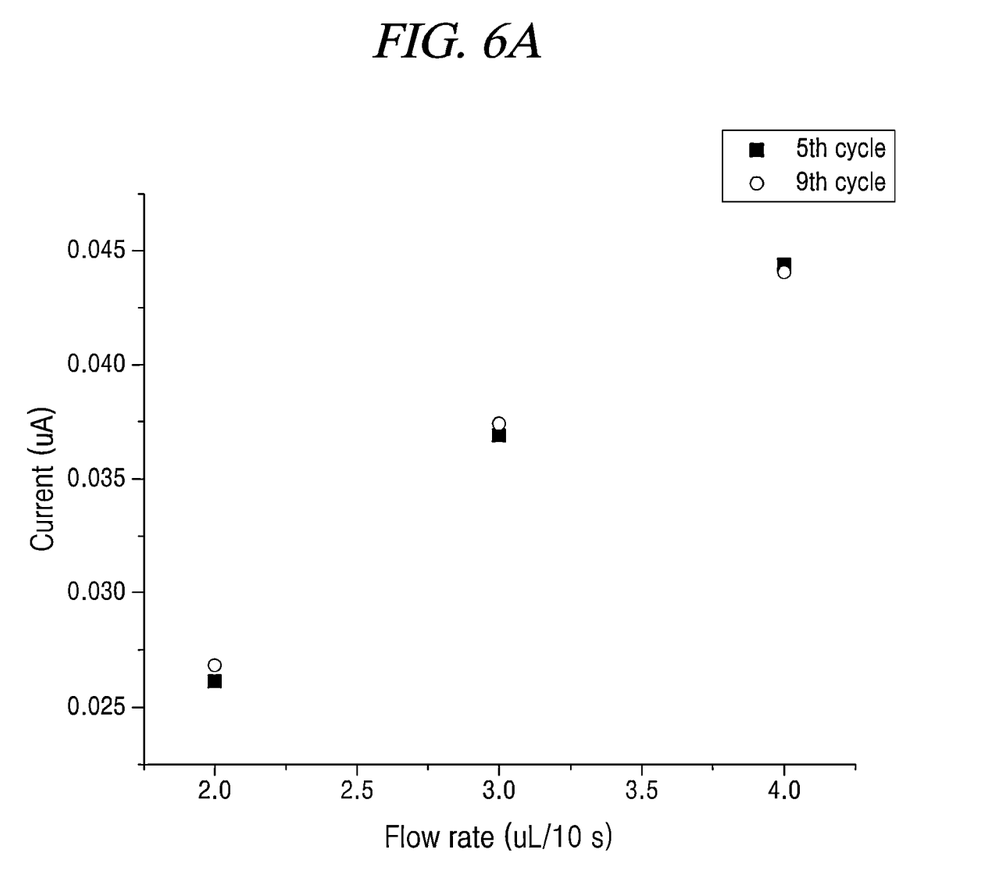
FIG. 6A is a graph of linearity of a flow rate and a current according to an embodiment of the present invention.

FIG. 6A is a graph of linearity of a flow rate and a current, according to an embodiment of the present invention.

Referring to FIG. 6A, a peak current may be associated with a flow rate. When the solution is 4 μL, it is estimated that the current is slightly reduced because a volume of the solution is slightly greater than a volume of the space 125.

Figure 6B:
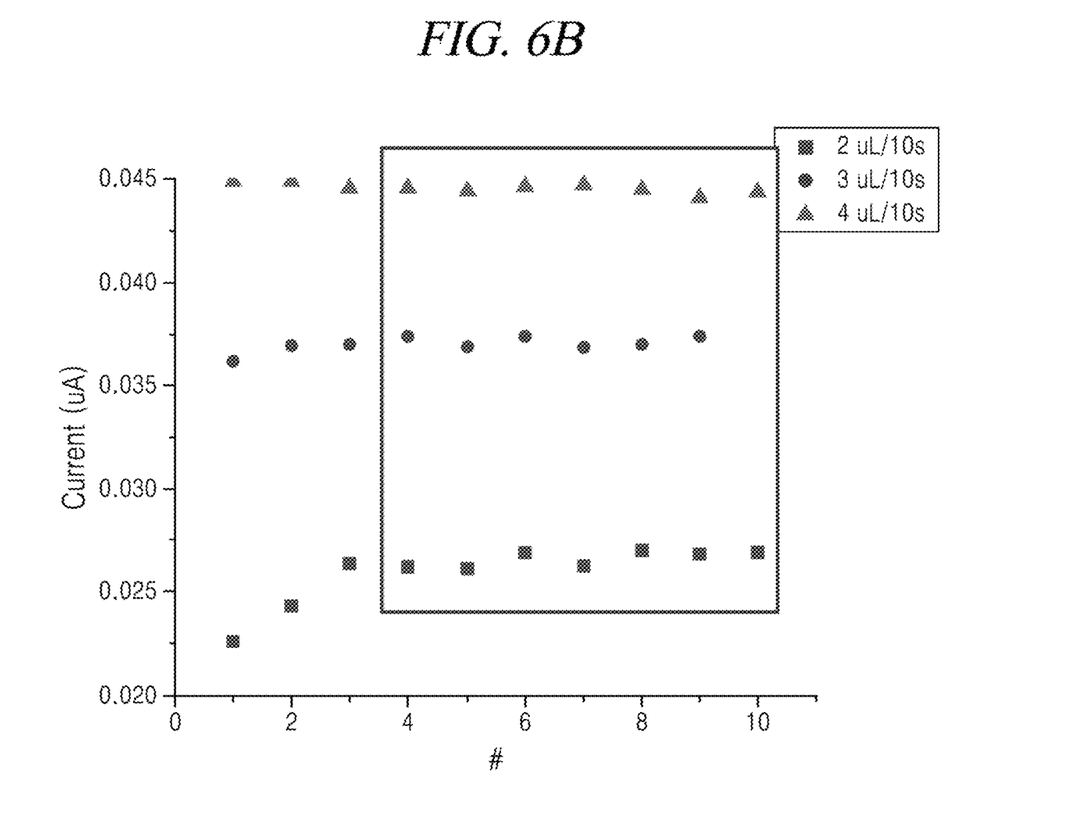
FIG. 6B is a graph of stability of a current according to a flow rate, according to an embodiment of the present invention.

FIG. 6B is a graph of stability of a current according to a flow rate, according to an embodiment of the present invention.

Referring to FIG. 6B, as a result of repeated experiments several times at each flow rate, it may be seen that reproducibility is within 2%.

It was confirmed that the first three pieces of data were caused by instability of the first use of the syringe pump, and accordingly, average and standard deviation were calculated from the remaining seven pieces of data. When the solution is 2 μL, a precision is 1.5% at 27±0.4 nA, and when the solution is 3 μL, a precision is 0.8% at 37±0.3 nA, and when the solution is 4 μL, a precision is 0.8% at 45±0.3 nA.

Figure 7:
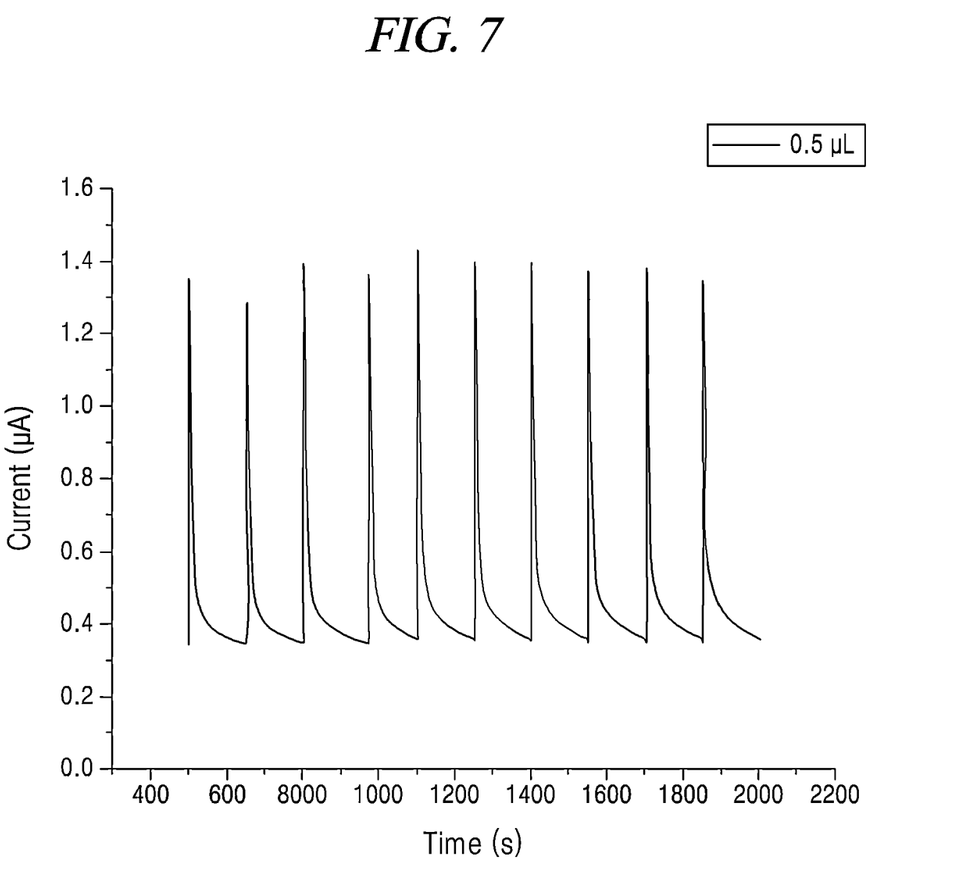
FIG. 7 is a graph illustrating a change in current characteristics according to injection of an ionic solution between electrodes polarized at intervals of 50 um, according to an embodiment of the present invention.

FIG. 7 is a graph illustrating a change in current characteristics according to injection of an ionic solution between electrodes polarized at intervals of 50 um, according to an embodiment of the present invention.

(Example 3) Performance of Flow Rate Sensor Using Electrodes Having Distance of 50 Urn Therebetween Referring to FIG. 7, a flow rate sensor of an example 3 has a structure similar to the flow rate sensor of example 2, and a current was measure by using the flow rate sensor in which the distance between the electrodes 130 and 150 is 50 urn that is reduced by ⅟₂₀ and areas of the electrodes are increased by 18 times to 3 mm×19 mm. In this case, an internal volume of the space 125 was 3 μL which is similar to the volume in Example 2. When a voltage of 1.0 V is applied to both electrodes to stabilize a baseline and then a fluid of 0.5 μL is sequentially injected, current characteristics are constant as illustrated in FIG. 7.

Figure 8:
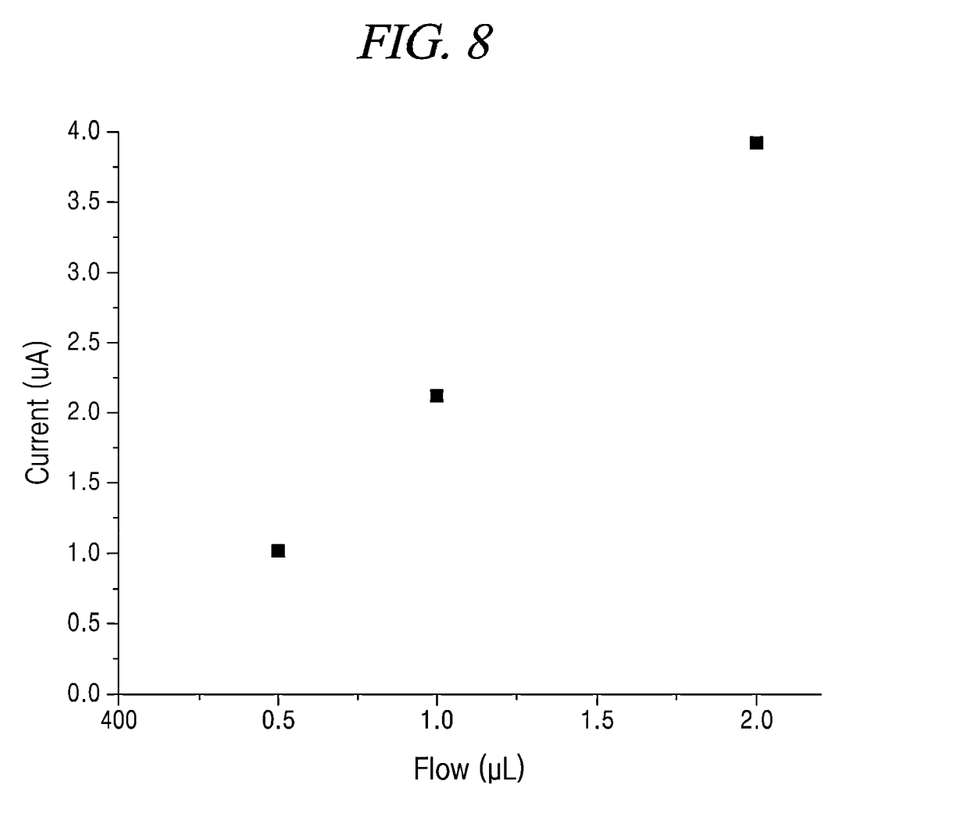
FIG. 8 is a graph illustrating a current change according to a flow rate according to an embodiment of the present invention.

FIG. 8 is a graph illustrating a current change according to a flow rate according to an embodiment of the present invention.

Referring to FIG. 8, by using a structure of the flow rate sensor in Example 3, solutions of Li2SO4 of 0.5 mM were injected respectively by 0.5 μL, 1.0 μL, and 2.0 μL for 10 seconds, and current characteristics were observed. In this case, as a volume of the injected solution increases, a current also increases, that is, current characteristics show that the current is proportional to the flow rate.

The above descriptions on the present invention are for illustration, and those skilled in the art to which the present invention pertains may understand that the descriptions may be easily modified into other specific forms without changing the technical idea or essential features of the present invention. Therefore, it should be understood that the embodiments described above are illustrative in all respects and not restrictive. For example, each component described as a single type may be implemented in a dispersed form, and likewise components described as distributed may be implemented in a combined form.

The scope of the present invention is indicated by the following claims rather than the above detailed description, and all changes or modifications derived from the meaning and scope of the claims and their equivalents should be interpreted as being included in the scope of the present invention.

The invention claimed is:

1. An electrochemical apparatus for monitoring flow rate comprising:
    a membrane including a space that is formed in a middle portion of the membrane and has a preset volume to contain an ionic fluid;
    a first electrode and a second electrode provided on opposite sides of the membrane; and
    a controller configured to apply a voltage to the first electrode and the second electrode to change a state of the space to a concentration polarization state,
    wherein the membrane includes a fluid flow passage through which a fluid flows into and out of the space, and
    the controller calculates a flow rate based on an ionic current generated by the fluid injected through the fluid flow passage in the concentration polarization state.

2. The electrochemical apparatus for monitoring flow rate of claim 1, wherein
    the fluid has a low ion concentration of 0.1 mM to 10 mM.

3. The electrochemical apparatus for monitoring flow rate of claim 1, wherein
    the space of the membrane has a volume of 2 μL to 4 μL.

4. The electrochemical apparatus for monitoring flow rate of claim 1, wherein
    a distance between the first electrode and the second electrode is 50 um to 1 mm.

5. The electrochemical apparatus for monitoring flow rate of claim 1, further comprising:
    connection portions formed in a protruding shape on one side of the first electrode and one side of the second electrode and electrically connected to the control unit.

6. The electrochemical apparatus for monitoring flow rate of claim 1, further comprising:
    a pumping unit connected to the fluid flow passage and configured to inject a fluid having a preset flow rate into the space.

7. The electrochemical apparatus for monitoring flow rate of claim 1, wherein the controller includes:
    a power supply configured to supply a preset voltage to the first electrode and the second electrode; and
    a current meter configured to measure an ionic current generated by ions of the fluid injected into the space which move to the first electrode and the second electrode.

* * * * *